United States Patent [19]
Interrante et al.

[11] Patent Number: 5,478,009
[45] Date of Patent: Dec. 26, 1995

[54] SELECTIVE REMOVAL OF A SINGLE SOLDER BALL FROM AN ARRAY OF SOLDER BALLS

[75] Inventors: Mario J. Interrante, New Paltz; Laertis Economikos, Wappingers Falls, both of N.Y.

[73] Assignee: International Business Machines Corporation, Armonk, N.Y.

[21] Appl. No.: 288,521

[22] Filed: Aug. 10, 1994

[51] Int. Cl.⁶ .................................................... H01L 21/00
[52] U.S. Cl. ............................... 228/264; 225/1; 225/93
[58] Field of Search .................................. 228/264; 225/1, 225/93

[56] References Cited

U.S. PATENT DOCUMENTS 4,417,679  11/1983  Shields ........................................ 225/93
5,170,929  12/1992  Long et al. ............................ 228/264 X

OTHER PUBLICATIONS

*Research Disclosure*, May 1992 No. 337 item 33739 by Kenneth Mason Publication Ltd.

*Primary Examiner*—Kenneth J. Ramsey
*Attorney, Agent, or Firm*—Whitham, Curtis Whitham & McGinn; Harold Huberfeld

[57] ABSTRACT

A solder ball removal tool uses ultrasonic vibrations to remove specific solder balls from high density chips, substrate solder ball terminal connections, card or board solder ball connections, or other solder ball array for the purpose of customizing the electrical functionality of a module. The tool also allows for the removal of damaged or defective solder balls for the purpose of replacement with defect free solder balls.

7 Claims, 3 Drawing Sheets

SELECTIVE REMOVAL OF A SINGLE SOLDER BALL FROM AN ARRAY OF SOLDER BALLS

BACKGROUND OF THE INVENTION

1. Field of the Invention

The present invention generally relates to the repair of electronic circuit modules and, more particularly, to the selective removal of a single solder ball from an array of solder balls. The invention has particular application to the repair of integrated circuit (IC) chips requiring the removal of single solder balls from high density chips without damaging neighboring solder balls or the base line metal. IC chips are but one example of an electronic circuit module, and other electronic circuit modules or interconnection devices employing arrays of solder balls may be repaired using the invention.

2. Description of the Prior Art

In the functional testing of VLSI systems incorporating FLIP chip C-4 (constant controlled collapsed connector) technology, it becomes necessary to modify or customize the electrical net list to fit a particular performance criteria. These modifications are called Engineering Changes (ECs) and occur at the module level by the addition of "discrete" wire connections and the deletion of specific Logic Service Terminals (LSTs) on the top surface of the module. Prior to instituting permanent Ecs, a series of Temp Fixes are generally made to verify correct electrical functionality. Temp Fixes and ECs involve many wire adds and/or LST deletions.

A simpler way of modifying the electrical net list and specifically that of deleting or opening an electrical circuit, would be to remove the specific solder ball from the high density chip involved in the respective circuit. When the chip is subsequently joined or reflowed to the module, that circuit connection is deleted. This method does not require the deletion or opening of the LST on the module which is a permanent alteration.

Currently, there is no method for removing solder ball connectors without a high risk of damaging adjacent solder balls or the base line metal (BLM). Mechanical devices used to remove solder balls, such as scalpel or knife, often remove more than one ball and damage the BLM.

SUMMARY OF THE INVENTION

It is therefore an object of the present invention to provide a tool that easily and inexpensively removes a solder ball connector from a high density integrated circuit chip, a substrate solder ball terminal connection, a card or board solder ball connection, or any solder ball array.

It is another object of the invention to provide a technique that removes solder ball connectors from an integrated circuit chip in a way that allows customizing of electrical net and/or engineering changes to be made quickly and efficiently and allows the original wiring to be restorable.

According to the invention, there is provided a solder ball removal tool having an attached ultrasonic transducer of specific wavelength and frequency to remove specific solder balls from high density chips or any solder ball array. The removal tool is formed as a cylindrical body attached to a cone terminating in a tip. The tip is formed with a frusto-conical base supporting a smaller hollow cylinder. In the preferred embodiment, the cylindrical body is formed with a capillary which extends through the cone to the tip. The capillary allows for the attachment of a vacuum line to the tool. The tip is placed on a solder ball to be removed, and ultrasonic vibrations of sufficient amplitude produced by the ultrasonic transducer attached to the cylindrical body cause the solder ball to be dislodged, allowing for easy removal of the solder ball without disturbing neighboring solder balls. The use of a vacuum allows for more efficient use of the tool by sucking the dislodged solder ball out of the tool. The invention thus allows for ECs without permanently altering the LST structure of the module and also allows for replacement of the solder ball if required.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
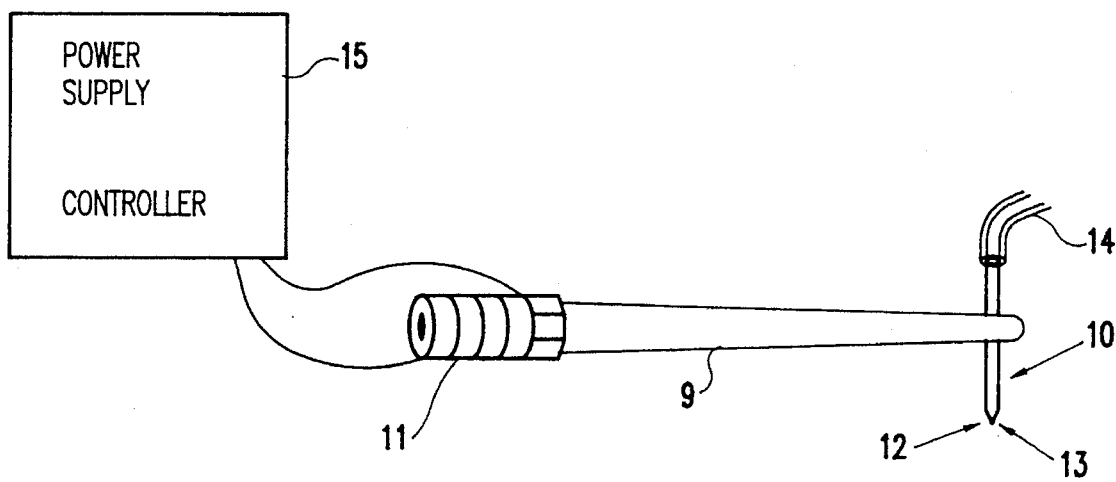
FIG. 1 is a side view of the tool according to the invention.

Referring now to the drawings, and more particularly to FIG. 1, there is shown the major components of the tool according to a preferred embodiment of the invention. The tool comprises a cylindrical body 10 attached to an ultrasonic horn 9 with field electrical transducer 11 and at the one end of the cylindrical body thereof a cone 12 terminating in a tip 13. At the end opposite the cone 12 there is provided a vacuum line 14 which may be attached to a suction pump (not shown). The ultrasonic transducer 11 is connected to a controller/power supply 15 which applies energizing current to the transducer 11, setting up vibrations in the tool that propagate to the tip 13.

Figure 2A:
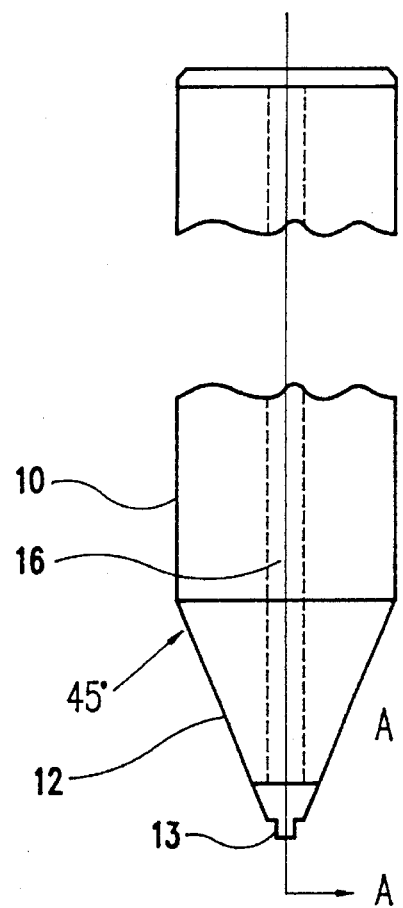
FIG. 2A is a vertical cross section of the tool cylindrical body of the tool with attached cone and tip.
Figure 2B:
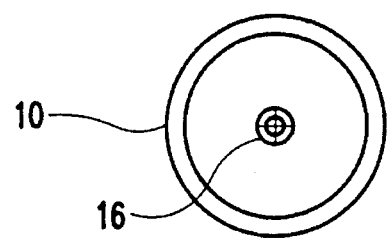
FIG. 2B is a horizontal cross section of the cylindrical body of the tool.

FIG. 2A shows a cross section of the cylindrical body 10, cone 12 and tip 13. As shown in FIG. 2A, the cone 12 has a frusto-conical shape which, at its base, is the same diameter as the cylindrical body 10. Instead of a point, the other end of the cone 12 terminates in a flat surface which has a diameter that mates with the base of the tip 13. The angle of cone 12 does not change the operation of the tool; however, narrow angled cones will make it possible to remove solder balls from highly populated chips without disturbing neighboring solder balls. Also, as shown in FIG. 2A, the cylindrical body 10 also has an optional capillary 16 which extends through the cone 12 to the tip 13. FIG. 2B is a horizontal cross-sectional view which shows the cylindrical body 12 with capillary 16.

Figure 3:
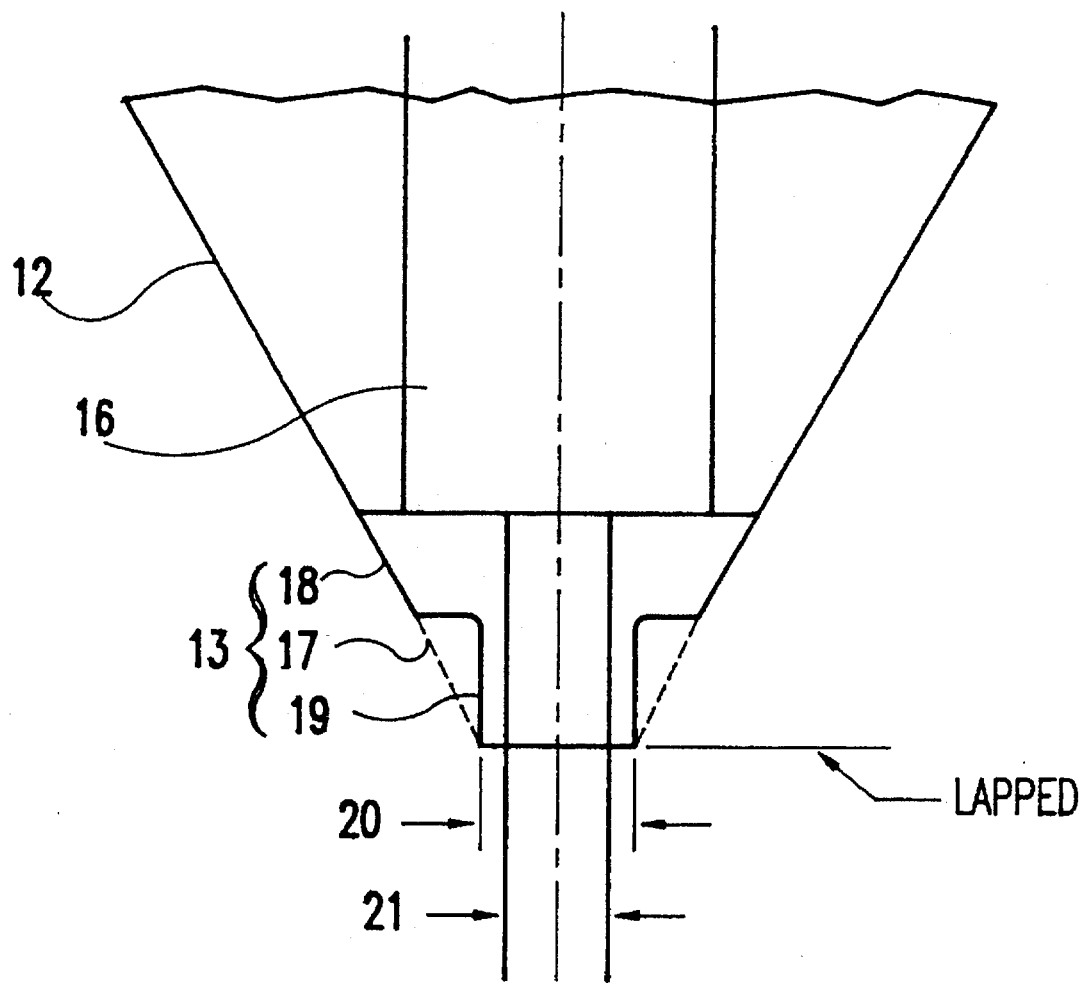
FIG. 3 is a detailed vertical cross section of the tip and cone of the tool.

In FIG. 3, there is shown a more detailed view of the cone 12 and tip 13. The cone 12 is preferably constructed from wear resistant materials such as tungsten, titanium, tungsten carbide, titanium carbide or alumina, and is most preferably constructed from tungsten carbide. As mentioned, the cone 12 does not extend to a point but is cut off for the attachment of the tip 13. The frusto-conical base of tip 13 has a horizontal ledge 17 which has sides 18 angled so as to be a continuation of the surface of the cone 12. Perpendicular to horizontal ledge 17 is small cylinder 19. Small cylinder 19 has an outer diameter 20 and inner diameter 21. The diameter 22 of capillary 16 is larger than the outer diameter 20 of the small cylinder 19.

In operation, the tip 13 is lowered onto the solder ball connector to be removed and the transducer 11 energized for up to 200 milliseconds. The amplitude of vibration is such that the solder ball connector is microsheared from the chip just above the base line metal. Due to the shape of the cavity, the solder is wedged and pressed upwards into the cone, and the solder ball connector comes away with the tip. If any difficulties are encountered in removing the solder ball from the tip, reenergizing the transducer after the tip is lifted from the chip will quickly dislodge any solder ball.

The shape of tip 13 allows for easy alignment of tool over a solder ball and prevents disturbances of neighboring solder balls when the tool is in operation. The optional capillary 16 provides for the attachment of vacuum line 14 to the tool. With the vacuum line attached to a suction pump, once the tool has been used to remove a solder ball and the solder ball is lodged in the tip 13, the vacuum sucks the solder ball out of the tool. The use of the vacuum allows for more efficient use of the tool.

Figure 4:
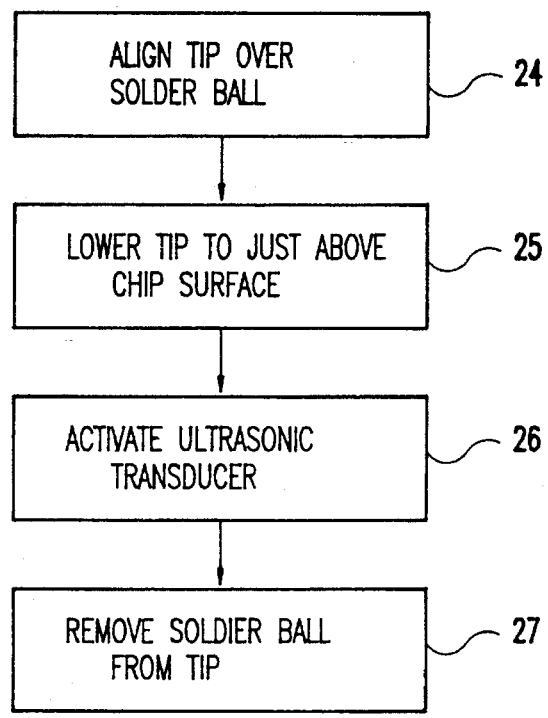
FIG. 4 is a flow diagram illustrating the operation of the tool.

FIG. 4 is a flow diagram showing the steps in the use of this tool. First, the tip with is attached to an ultrasonic horn and transducer is aligned over the solder ball to be removed in step 24. The tip is then lowered to just above the chip surface fully surrounding the solder ball in step 25. The ultrasonic transducer is activated in step 26, removing the solder ball by vibration. Finally, the solder ball is removed from the tip of the tool in step 27, by action of a vacuum applied to capillary 16 and by reenergizing the transducer.

Solder ball connectors can be restored by selective solder ball addition or by joining a fully populated chip once all wiring changes are complete and the system debugged.

While the invention has been described in terms of a single preferred embodiment with an optional vacuum suction to facilitate the efficient use of the tool, those skilled in the art will recognize that the invention can be practiced with modification within the spirit and scope of the appended claims.

Having thus described our invention, what we claim as new and desire to secure by Letters Patent is as follows:

1. A solder ball removal tool used to remove a single solder ball in a solder ball array on a base comprising:

a cylindrical body having attached at one end a cone with a tip, said tip being formed with a small hollow cylindrical opening to receive a solder ball to be removed; and an ultrasonic transducer and horn attached to the cylindrical body, said ultrasonic transducer being energized to produce vibrations which are propagated to said tip which, when said tip is placed over a solder ball to be removed, causes the solder ball to dislodge by microshearing of the ball from the base.

2. A solder ball removal tool as recited in claim 1 wherein said tip is made of material selected from the group consisting of tungsten carbide, titanium carbide, tungsten, titanium, or alumina.

3. A solder ball removal tool as recited in claim 1 wherein said cylindrical body has a capillary extending through said cylindrical body and said cone to said small hollow cylindrical opening, and further comprising a vacuum line communicating with said capillary for attachment to a suction pump.

4. A method of removing a single solder ball from an array of solder balls on a base comprising the steps of:

positioning a cylindrical body having attached at one end a cone with a tip over a solder ball to be removed, said tip being formed with a small hollow cylindrical opening to receive the solder ball to be removed; and applying ultrasonic vibrations from a transducer to the cylindrical body, which vibrations are propagated to said tip causing the solder ball to dislodge by microshearing of the ball from the base.

5. The method of removing a single solder ball from an array of solder balls as recited in claim 4 wherein said cylindrical body has a capillary extending through said cylindrical body and said cone to said small hollow cylindrical opening, further comprising the step of drawing a vacuum on the capillary to remove fragments of the solder ball.

6. A method of removing a fine feature projecting from the surface of an article comprising the steps of:

placing a tool having a hollow conical tip over said fine feature and in contact therewith; and vibrating said tool in a direction parallel to said surface to remove said feature from said surface.

7. The method recited in claim 6 wherein said article is an electronic circuit module and said feature is a solder ball attached to a contact pad within an array of solder balls attached to contact pads and said step of vibrating is performed by inducing ultrasonic vibrations in said tool.

* * * * *